United States Patent [19]

Kanda

[11] 4,224,641
[45] Sep. 23, 1980

[54] ABNORMALITY INDICATION SYSTEM OF FACSIMILE APPARATUS

[75] Inventor: Hajime Kanda, Ayase, Japan

[73] Assignee: Ricoh Company, Limited, Tokyo, Japan

[21] Appl. No.: 35,720

[22] Filed: May 3, 1979

[30] Foreign Application Priority Data

May 12, 1978 [JP] Japan .................................. 53/55552

[51] Int. Cl.² ............................................. H04N 1/32
[52] U.S. Cl. ..................................... 358/257; 340/715
[58] Field of Search ................. 358/257, 256; 340/715

[56] References Cited

U.S. PATENT DOCUMENTS

| | | | |
|---|---|---|---|
| 3,051,955 | 8/1962 | Pfleger | 340/715 |
| 3,469,252 | 9/1969 | Bet | 340/715 |
| 3,548,403 | 12/1970 | Johnson | 340/715 |
| 3,962,534 | 6/1976 | Ogawa | 358/257 |
| 4,001,807 | 1/1977 | Dallimonti | 340/715 |
| 4,017,680 | 4/1977 | Anderson | 340/715 |

*Primary Examiner*—Howard W. Britton
*Attorney, Agent, or Firm*—Oblon, Fisher, Spivak, McClelland & Maier

[57] ABSTRACT

An abnormality indication system of a facsimile apparatus comprises a pattern generator, disposed in the facsimile apparatus on the reception side, which is capable of producing image element information indicating the abnormality of the facsimile apparatus when the facsimile apparatus is hung up and which applies the abnormality indicating information to a plotter of the facsimile apparatus, instead of an original image information so far applied to the plotter. The abnormality indicating information is written on a recording sheet by the plotter and the recording sheet is then discharged from the plotter.

7 Claims, 2 Drawing Figures

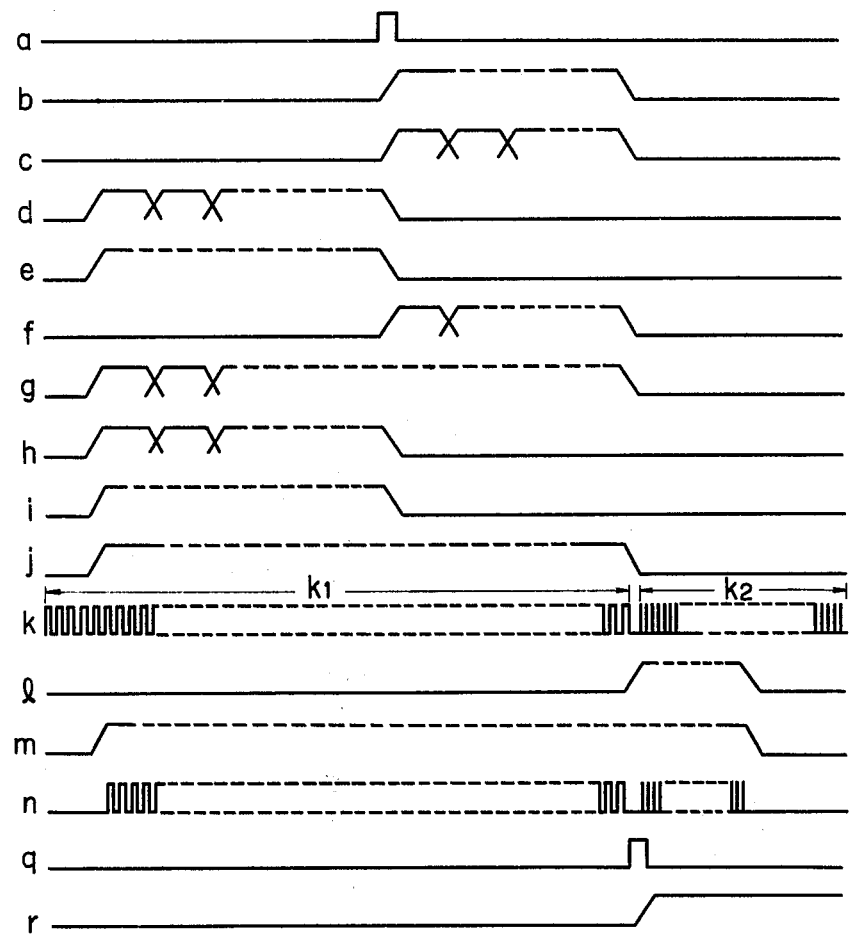

ABNORMALITY INDICATION SYSTEM OF FACSIMILE APPARATUS

BACKGROUND OF THE INVENTION

The present invention relates to an abnormality indication system of a facsimile apparatus and, in particular, to an abnormality indication system capable of indicating an abnormality of the facsimile apparatus to a recipient of image information from a transmitting side when some abnormality occurs to the facsimile apparatus and recording is discontinued during the step of recording of image information on the information reception side.

Generally, in the facsimile apparatus, when some abnormality occurs, such as (1) errors in data during transmission, which exceed a predetermined number of errors, (2) instantaneous disconnection of the telephone circuit, (3) erroneous depression of a stop button on the reception side, and (4) some failure on the transmission side, particularly, failure of handshaking in the case of transmission of multi pages. A blank recording sheet is discharged on the reception side after discontinuing the recording immediately.

Therefore, in the case where the facsimile apparatus is hung up due to the above-mentioned abnormality and the blank recording sheet is taken out, the recipient cannot tell from such blank recording sheet whether an abnormality has occurred or whether a second half portion of the original itself is blank or not, which may cause a misunderstanding between the transmission side and the reception side.

SUMMARY OF THE INVENTION

It is therefore an object of the present invention to provide an abnormality indication system of a facsimile apparatus, which is capable of having a recipient understand clearly the abnormality of the facsimile apparatus when the facsimile apparatus is hung up, in contrast with the shortcomings of the conventional facsimile apparatus.

In order to attain this object, in the present invention, an information producing means capable of producing information indicating the abnormality of the facsimile apparatus is provided on the reception side and when the facsimile apparatus is hung up, the information producing means is actuated so that an abnormality indicating signal comprising letters or marks is written on a recording sheet.

According to the present invention, when a recording sheet with a second half of it being blank is received, for example, the recipient can tell whether it is a recording sheet received in the normal condition or in the hung-up condition.

BRIEF DESCRIPTION OF THE DRAWINGS

For a better understanding of the invention as well as the objects and other features thereof, reference will be had to the following detailed description which is to be read in conjunction with the drawings wherein:

FIG. 2 is a timing chart of the signals of each part of the recording apparatus of FIG. 1.

DETAILED DESCRIPTION OF THE PREFERRED EMBODIMENT

Figure 1:
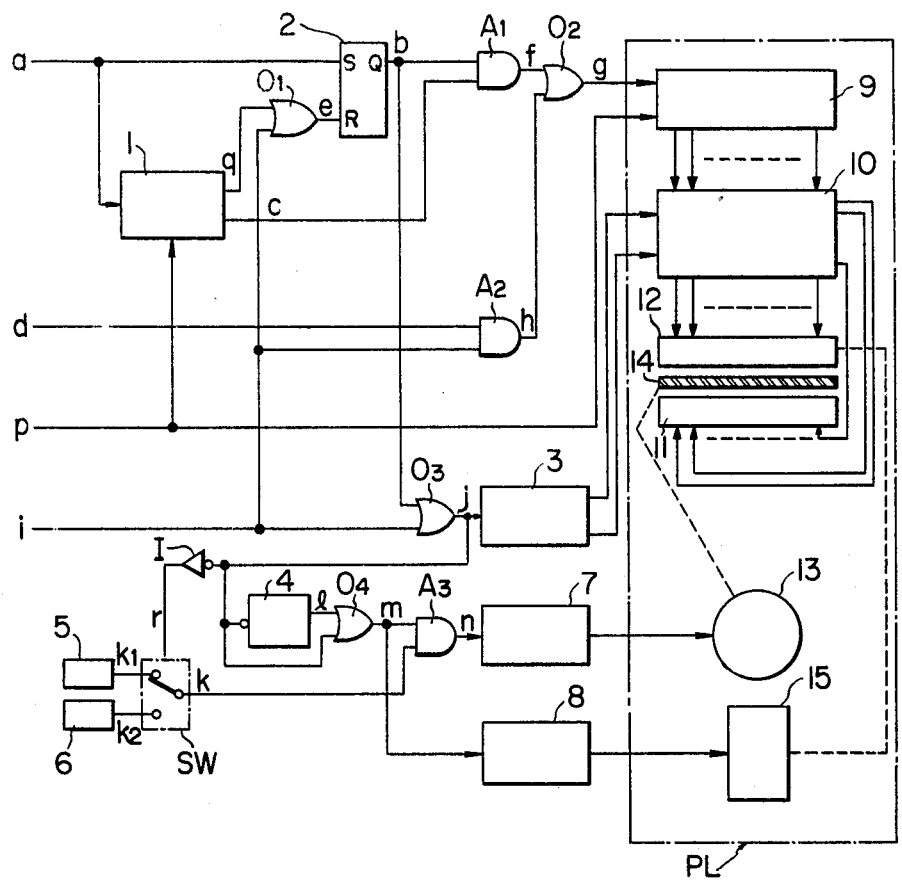
FIG. 1 is a schematic block diagram of a recording apparatus in which an abnormality indication system according to the present invention is employed.

Referring now to FIG. 1 and FIG. 2, an embodiment of an abnormality indication system according to the present invention will be explained.

In FIG. 1, there is shown a schematic block diagram of a recording apparatus of a facsimile apparatus, on the reception side, in which the abnormality indication system according to the present invention is employed. In the figure, reference numeral 1 represents an information producing means for producing information indicating an abnormality of the facsimile apparatus, namely a pattern generator, which applies to a plotter PL an image element information c indicating the abnormality of the facsimile apparatus in response to a hang-up detection signal a when the facsimile apparatus on the reception side is hung up and which applies an image element information termination pulse q to an OR gate $0_1$ when the application of the image element information c is over.

Reference numeral 2 represents a R-S flip-flop which is set by the hang-up detection signal a and is reset by the image element information termination pulse q from the pattern generator 1.

Reference numeral 3 represents a high voltage generation circuit for applying $+H(V)$ and $-H(V)$ to a stylus electrode 11 and a segment electrode 12 of the plotter PL. Reference numeral 4 represents a delay circuit for producing an output l when a pulse from a high speed clock pulse generator 6 is applied to a pulse motor drive circuit 7, for a predetermined period of time, in order to discharge a recording sheet 14 at a high speed after an abnormal state indication mark has been recorded on the recording sheet 14. In the normal condition, a pulse $k_1$ from a sub-scanning clock pulse generator 5 is applied to the pulse motor drive circuit 7 so that a pulse motor 13 is driven. Reference numeral 8 represents a solenoid drive circuit which is actuated, with a solenoid 15 energized, when some data is written on the recording sheet 14.

SW represents a charge-over switch, such as an electronic switch for changing over the circuit from the sub-scanning clock pulse generator 5 side to the high speed clock pulse generator 6 side by a changeover signal r which is produced after completion of recording of the abnormal state indication mark.

In the plotter PL, an image information d transmitted from the transmission side or the image element information c from the pattern generator 1 is converted into a parallel signal by a deserializer circuit 9 and the parallel signal is then applied to an electrode drive circuit 10. In accordance with the signal from the deserializer circuit 9, the electrode drive circuit 10 applies a high voltage $+H(V)$ or $-H(V)$, generated by the high voltage generation circuit 3, to the predetermined electrodes of the stylus electrode 11 and of the segment electrode 12. The pulse motor 13 is driven by the pulse $k_1$, from the sub-scanning clock pulse generator 5, so that the recording sheet 14 is transported in the sub-scanning direction at the time of recording. When the facsimile apparatus is hung up, after the completion of recording of the image element information c, the pulse motor 13 is continuously driven for a predetermined period of time by a high speed pulse $k_2$ from the high speed clock pulse generator 6, so that the recording sheet 14 is discharged from the facsimile apparatus at a high speed.

Referring to a timing chart in FIG. 2, the operation of the thus constructed apparatus will now be explained. When the facsimile apparatus is normally operated, the flip-flop 2 is in the reset condition and the image information d and a high voltage enable signal i are applied to the facsimile apparatus. As a result, a signal j is produced as an output of an OR gate $O_3$ and an AND gate $A_3$ is opened and a solenoid 15 is energized through a solenoid circuit 8 and the segment electrode 12 is set at the recording sheet 14. The image information d transmitted to the recording apparatus is stored in the deserializer circuit 9 through an AND gate $A_2$ and an OR gate $O_2$ in synchronism with a synchronizing clock p. The information d stored in the deserializer circuit 9 is then taken out in parallel and is applied to the electrode drive circuit 10. The electrode drive circuit 10 applies a high voltage $+H(V)$ or $-H(V)$, produced by the high voltage generation circuit 3, to the predetermined one or both of the stylus electrode 11 and the segment electrode 12 in accordance with the image information d applied to the electrode drive circuit 10. In the meantime, since the change-over switch SW is connected to the sub-scanning clock pulse generator 5 side, the pulse motor 13 drives the recording sheet 14 in the sub-scanning direction at a predetermined transportation speed in accordance with the sub-scanning transportation pulse $k_1$ applied to the pulse motor drive circuit 7 through the AND gate $A_3$.

Thus, in the normal condition, the image information d transmitted from the transmission side is successively recorded on the recording sheet 14.

Now, in the case where the facsimile apparatus is hung up by some errors during transmission, instantaneous disconnection of the telephone circuit, errorneous operation of the stop button and some communication error during recording of image information on the recording sheet 14 as mentioned previously, the hang-up detection signal a is applied to the facsimile apparatus, and the pattern generator 1 is actuated and, at the same time, the flip-flop 2 is set. At this moment, application of the image information d and the high voltage enable signal i is stopped simultaneously with the hang-up of the facsimile apparatus.

Even though the application of the high voltage enable signal i is stopped, since the flip-flop 2 is set, and the set output b is applied to the OR gate $O_3$, the high voltage enable signal i is maintained in the output condition and the high voltage generation circuit 3, the pulse motor drive circuit 7, and the solenoid drive circuit 8 are respectively maintained in the actuation condition as before.

In the meantime, instead of the image information so far applied to the deserializer circuit 9, the image element information c, which is generated by the pattern generator 1, is applied to the deserializer circuit 9 through the AND gate $A_1$ and the OR gate $O_2$.

As a result, instead of the image information so far recorded on the recording sheet 14, the abnormal state indication mark, which indicates that the facsimile apparatus is hung up and which is produced by the pattern generator 1, is written on the recording sheet 14.

When the writing of the abnormal state indication mark on the recording sheet 14 has been completed, the application of the image element information c is terminated and the termination pulse q is produced, so that the flip-flop 2 is reset.

By the resetting of the flip-flop 2, no information is applied to the deserializer circuit 9 any further. At the same time, production of the output j from the OR gate $O_3$ is stopped and the actuation of the high voltage generation circuit 3 is stopped, and by stopping the application of the output j, the delay circuit 4 is actuated so that a delay output l is produced. As a result, by an output m which is generated succeedingly from an OR gate $O_4$, the pulse motor drive circuit 7 and the solenoid drive circuit 8 are continuously maintained in the operating condition.

By the signal r, which is produced by the output j being inverted by an inverter I, with the stoppage of the output j from the OR gate $O_3$, the changeover switch SW is changed over so that the high speed pulse $k_2$, from the high speed clock pulse generator 6, is applied to the pulse motor drive circuit 7.

Consequently, after the facsimile abnormal state indication mark is written on the recording sheet 14, the plotter PL stops recording and the recording sheet 14 is discharged from the facsimile apparatus at a high speed.

When the recording sheet 14 has been discharged, the delay output l of the delay circuit 4 is also stopped, so that the pulse motor 13 is stopped and, at the same time, the solenoid 15 is deenergized and the segment 12 is moved upwards and the facsimile apparatus is set ready for the next recording sheet.

While a specific embodiment of the invention has been shown and described in detail to illustrate the application of the principles of the invention, it will be understood that the invention may be embodied otherwise without departing from such principles.

What is claimed is:

1. An abnormality indication system of a facsimile apparatus comprising:
    a recording sheet,
    a recording means for recording information on said recording sheet,
    an information producing means for producing information indicating an abnormality of said facsimile apparatus,
    a change-over means for changing over information to be applied to said recording means from an original image information to said information indicating an abnormality of said facsimile apparatus, which is produced by said information producing means at the time of hang-up of said facsimile apparatus, and
    a recording stop and recording sheet discharge means for stopping the recording of information and discharging said recording sheet from said facsimile apparatus when the production of said information indicating an abnormality of said facsimile apparatus by said information producing means is terminated.

2. An abnormality indication system of a facsimile apparatus as claimed in claim 1, wherein said recording means comprises a stylus electrode and a segment electrode; and a high voltage generation circuit for applying a high voltage between said stylus electrode and said segment electrode.

3. An abnormality indication system of a facsimile apparatus as claimed in claim 1, wherein said information producing means is a pattern generator capable of producing an abnormality indication image element information comprising letters or marks in accordance with a hang-up detection signal which is produced when said facsimile apparatus is hung up.

4. An abnormality indication system of a facsimile apparatus as claimed in claim 1, wherein said changeover means comprises a flip-flop which is set by a hang-up signal produced when said facsimile apparatus is hung up and which is reset by termination of information indicating an abnormality of said facsimile apparatus, and a gate for permitting said information indicating an abnormality of said facsimile apparatus to pass therethrough by a set output of said flip-flop.

5. An abnormality indication system of a facsimile apparatus as claimed in claim 1, wherein said recording stop and recording sheet discharge means comprises a pulse motor for discharging said recording sheet, a pulse generator for generating a pulse for driving said pulse motor at a higher speed than that at the time of the recording step, and a pulse motor drive circuit for driving said pulse motor by said pulse.

6. An abnormality indication system of a facsimile apparatus as claimed in claim 4, wherein said recording means comprises a stylus electrode and a segment electrode; and a high voltage generation circuit for applying a high voltage between said stylus electrode and said segment electrode, and said high voltage generation circuit is maintained in an actuation state by a set output of said flip-flop.

7. An abnormality indication system of a facsimile apparatus as claimed in claim 4, wherein said recording stop and recording sheet discharge means comprises a pulse motor for discharging said recording sheet, a pulse generator for generating a pulse for driving said pulse motor at a higher speed than that at the time of the recording step, and a pulse motor drive circuit for driving said pulse motor by said pulse, and said pulse motor drive circuit being maintained in an actuation state by a set output of said flip-flop.

* * * * *